April 16, 1940.  R. S. KEMP  2,197,184
FLEXIBLE LENS SHADE
Filed Aug. 12, 1938
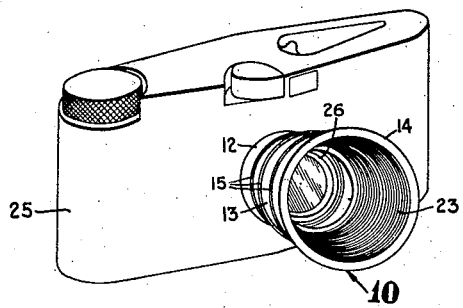
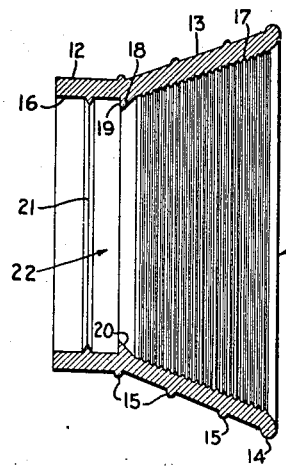
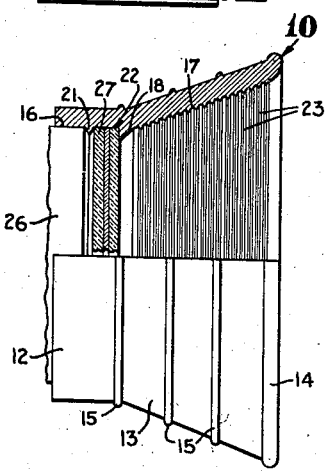
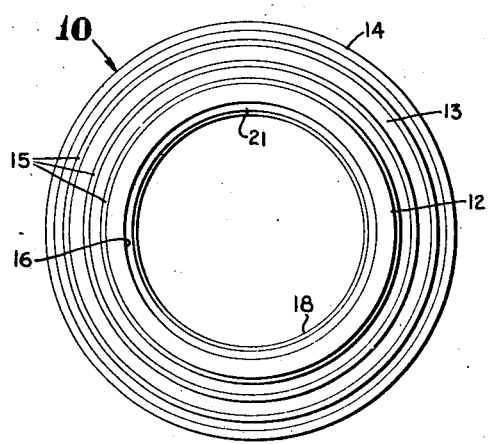
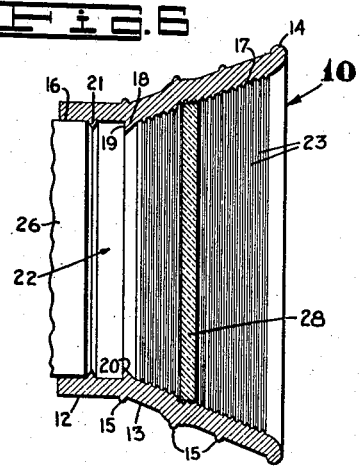
INVENTOR.
Robert S. Kemp.
BY
ATTORNEY.

Patented Apr. 16, 1940

2,197,184

UNITED STATES PATENT OFFICE 2,197,184

FLEXIBLE LENS SHADE

Robert S. Kemp, Alhambra, Calif.

Application August 12, 1938, Serial No. 224,515

2 Claims. (Cl. 88—1)

This invention relates to improvements in sun shades for the lens of various types of cameras.

The general object of this invention is to provide an improved lens shade which includes means for supporting a filter in front of the camera lens.

Another object of the invention is to provide a lens shade which is made of a flexible material.

A further object of the invention is to provide a lens shade made of flexible material which includes means for supporting filters of different sizes.

Other objects and the advantages of this invention will be apparent from the following description taken in connection with the accompanying drawing, wherein:

Fig. 1 is a perspective view of a camera showing my improved lens shade mounted thereon;

Fig. 2 is an enlarged central section through my improved lens shade;

Fig. 3 is a rear end view of the device shown in Fig. 2;

Fig. 4 is an enlarged fragmentary section of the lens shade;

Fig. 5 is a side elevation of the lens shade partly in section showing it mounted on the lens barrel of a camera and showing a filter operatively mounted in the shade; and Fig. 6 is a section through the shade showing it operatively mounted on the lens barrel of a camera with a large filter operatively mounted in the shade.

Referring to the drawing by reference characters I have illustrated my lens shade as embodied in a device which is indicated generally at 10. The lens shade 10 is preferably made of a good grade of flexible rubber and includes a cylindrical rear portion 12 from which a forwardly enlarging frusto-conical portion 13 extends.

The forward portion of the conical portion 13 which is integral with the portion 12 preferably has an external strengthening bead 14 thereon and intermediate the bead 14 and the juncture of the cylindrical portion and the conical portion I provide a plurality of similar reduced beads 15.

The portion 12 has a cylindrical aperture 16 therein and the conical portion 13 has a conical aperture 17 therein communicating with the aperture 16. At the juncture of the apertures 16 and 17 I provide an inwardly extending annular flange portion 18 the rear face of which is plane to form a flat shoulder 19 and the forward face of which is preferably bevelled as indicated at 20.

In the portion 12 intermediate the rear face thereof and the flange 18 I provide an inwardly extending annular flange portion 21 both faces of which are preferably bevelled. The space between the flange 18 and the flange 21 forms a filter receiving chamber which is indicated at 22.

Within the conical aperture 17 I provide a plurality of spaced inwardly extending annular flanges or ribs 23 both faces of which are bevelled to intersect as clearly shown in Fig. 4.

When the lens shade 10 is to be used in conjunction with a camera such as the camera 25 shown in Fig. 1 the resilient portion 12 of the shade is placed over the lens frame 26 of the camera with the lens frame positioned in the aperture 16 and the end thereof engaging the flange 21 as clearly shown in Fig. 5.

In Fig. 5 I have shown a glass and gelatin type color filter 27 of the correct size for use with this device operatively mounted in the shade. When the color filter 27 is to be used it is positioned in the chamber 22 before the lens shade is placed on the camera lens frame. The correct size color filter is approximately the same diameter or slightly larger than the diameter of the aperture 16 and is securely held by the flange 21 due to the resiliency of the rubber of which the device is made.

In Fig. 6 I have shown a solid glass color filter 28 which is of too large a diameter to be positioned in the lens shade 10. When a filter such as the color filter 28 is used it is inserted in the conical aperture 17 and firmly pressed therein until it is firmly gripped by the ribs 23 as clearly shown in Fig. 6. The sharp inner edges of the ribs 26 provide a rough surface engaging the periphery of the filter and preventing accidental shifting of the filter.

Thus it will be apparent that my improved device 10 not only functions as a shading device for the lens of a camera but also acts as a filter holder not only for the correct size adapted for use with the device but also as a holder for numerous sizes of over size filters. Furthermore due to the softness, resiliency and flexibility of the material of which my lens shade is made it does not injure or strain a color filter used therewith.

From the foregoing description it will be apparent that I have provided a novel lens shade for the lenses of cameras which is simple in construction and highly efficient in use.

Having thus described my invention, I claim:

1. A camera lens shade comprising a one piece body portion formed of flexible and resilient material, said body including an open ended cylindrical portion and a frusto-conical portion extending therefrom, said body including an inwardly extending resilient circular flange adjacent the juncture of said cylindrical and conical apertures, said body within said cylindrical portion having an inwardly projecting resilient rib, said rib being spaced from said flange.

2. A camera lens shade comprising a one piece body portion formed of rubber and including a resilient cylindrical portion adapted to engage a lens barrel and a frusto-conical portion extending from one end thereof, said body having an inwardly extending resilient flange adjacent the juncture of said cylindrical and conical portions, said body also having an inwardly extending resilient flange intermediate said first flange and the other end of said cylindrical portion, said first flange being wider than the second flange, said conical portion on the inner surface thereof including a plurality of axially spaced annular ribs.

ROBERT S. KEMP.